(12) United States Patent  
Courtier et al.

(10) Patent No.: US 11,208,198 B2  
(45) Date of Patent: Dec. 28, 2021

(54) COMPOSITE PROPELLER VANE OR BLADE FOR AIRCRAFT INTEGRATING A CONFORMATION PART

(71) Applicant: SAFRAN AIRCRAFT ENGINES, Paris (FR)

(72) Inventors: Vivien Mickaël Courtier, Moissy-Cramayel (FR); Dominique Gerhardt Mayhew, Moissy-Cramayel (FR); Adrien Jacques Philippe Fabre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 162 days.

(21) Appl. No.: 16/743,320

(22) Filed: Jan. 15, 2020

(65) Prior Publication Data

US 2020/0223531 A1 Jul. 16, 2020

(30) Foreign Application Priority Data

Jan. 15, 2019 (FR) ...................................... 1900348

(51) Int. Cl.
*B64C 11/26* (2006.01)
*D03D 1/00* (2006.01)
(Continued)

(52) U.S. Cl.
CPC ................ *B64C 11/26* (2013.01); *D03D 1/00* (2013.01); *D03D 13/004* (2013.01);
(Continued)

(58) Field of Classification Search
CPC ........... B64C 11/26; F01D 5/282; D03D 1/00; D03D 13/004; D03D 25/005
See application file for complete search history.

(56) References Cited

U.S. PATENT DOCUMENTS 5,049,036 A * 9/1991 Bailey ..................... F01D 5/282  
                                                                                    416/230  
5,279,892 A * 1/1994 Baldwin ............ B29D 99/0025  
                                                                                    442/206

(Continued)

FOREIGN PATENT DOCUMENTS

EP     1 526 285 A1     4/2005  
EP     3 019 398 A1     5/2016  
(Continued)

OTHER PUBLICATIONS

Search Report as issued in French Patent Application No. 1900348, dated Jul. 29, 2019.

*Primary Examiner* — Woody A Lee, Jr.  
(74) *Attorney, Agent, or Firm* — Pillsbury Winthrop Shaw Pittman LLP (57) ABSTRACT

A vane includes a fiber reinforcement having a three-dimensional weaving densified by a matrix, the fiber reinforcement including in a single woven part a root portion and an airfoil portion extending along a longitudinal direction between the root portion and a vane tip portion and along a transverse direction between a leading edge portion and a trailing edge portion. The airfoil portion includes first and second extrados and intrados faces. The fiber reinforcement includes a non-interlinking forming a housing inside the fiber reinforcement, a conformation part being present in the housing. The non-interlinking extends over a non-interlinked area inside the airfoil portion of the fiber reinforcement included between the root portion and the vane tip portion in the longitudinal direction and between the leading edge portion and the trailing edge portion in the transverse direction, the non-interlinking also opening outside the airfoil portion of the fiber reinforcement.

10 Claims, 7 Drawing Sheets

(51) Int. Cl.
  *D03D 13/00* (2006.01)
  *D03D 25/00* (2006.01)
  *F01D 5/28* (2006.01)

(52) U.S. Cl.
  CPC ........... *D03D 25/005* (2013.01); *F01D 5/282* (2013.01); *D10B 2505/02* (2013.01); *D10B 2505/12* (2013.01); *F05D 2230/50* (2013.01)

(56) References Cited

U.S. PATENT DOCUMENTS

| 5,340,280 | A * | 8/1994 | Schilling | F01D 5/282 |
| | | | | 416/229 A |
| 9,752,443 | B2 * | 9/2017 | Watanabe | C04B 37/001 |
| 10,414,487 | B2 * | 9/2019 | Laurenceau | B29D 99/0025 |
| 2010/0144227 | A1 * | 6/2010 | Coupe | B64C 25/12 |
| | | | | 442/207 |
| 2012/0177501 | A1 * | 7/2012 | Cairo | C22C 47/20 |
| | | | | 416/230 |
| 2013/0017093 | A1 * | 1/2013 | Coupe | B64C 11/26 |
| | | | | 416/230 |
| 2013/0052004 | A1 * | 2/2013 | Stilin | F01D 9/042 |
| | | | | 415/211.2 |
| 2013/0272893 | A1 * | 10/2013 | Fabre | F04D 29/324 |
| | | | | 416/226 |
| 2018/0119549 | A1 | 5/2018 | Vetters et al. | |
| 2019/0217943 | A1 * | 7/2019 | Courtier | B29C 70/86 |
| 2019/0323357 | A1 * | 10/2019 | Courtier | B64C 11/26 |

FOREIGN PATENT DOCUMENTS

| FR | 2 964 426 A1 | 3/2012 |
| WO | WO 2006/136755 A2 | 12/2006 |
| WO | WO 2012/001279 A1 | 1/2012 |
| WO | WO 2015/004362 A1 | 1/2015 |

* cited by examiner

COMPOSITE PROPELLER VANE OR BLADE FOR AIRCRAFT INTEGRATING A CONFORMATION PART

CROSS-REFERENCE TO RELATED APPLICATIONS

This application claims priority to French Patent Application No. 1900348, filed Jan. 15, 2019, the entire content of which is incorporated herein by reference in its entirety.

FIELD

The present invention relates to the field of propeller vanes or blades for aircrafts such as those located in turboprop engines.

BACKGROUND

The propeller vanes or blades for turboprop engines are generally made of metal material. If the propeller vanes or blades made of metal material have good mechanical strength, they nevertheless have the drawback of having a relatively large mass.

In order to obtain lighter propeller vanes or blades, it is known to produce propeller blades made of composite material, that is to say by producing structural parts with fiber reinforcement and resin matrix.

Documents US 2013/0017093 and WO 2012/001279 describe the production of a propeller blade from an airfoil fiber structure inside which part of a spar is introduced, one end of the spar being extended by a bulged portion intended to form the root of the propeller blade. The fiber structure, which is made in a single part by three-dimensional weaving, includes a non-interlinked area making it possible to form a housing inside the fiber structure in which part of the spar is inserted, the blade root being formed by the bulged portion of the spar which extends outside the airfoil fiber structure.

The propeller blade thus obtained has both a lightened overall mass and a significant mechanical strength by the skin presence of a structure made of composite material (fiber reinforcement densified by a matrix).

However, maintaining in position the spar added into the fiber structure and, consequently, the propeller blade root, may be delicate in some cases, such as for example when the blade is subjected to significant mechanical loads, impacts or shocks.

SUMMARY

It is therefore desirable to be able to propose a solution for producing aircraft propeller vanes or blades of the type described above but which have increased mechanical strength, particularly in terms of maintaining the vane or blade root in position relative to the airfoil fiber structure.

To this end, according to an aspect of the invention, an aircraft propeller vane or blade is proposed, comprising a fiber reinforcement having a three-dimensional weaving between a plurality of layers of warp yarns extending along a longitudinal direction and a plurality of layers of weft yarns extending along a transverse direction, the fiber reinforcement being densified by a matrix, the fiber reinforcement comprising in a single woven part a root portion and an airfoil portion extending along the longitudinal direction between the root portion and a vane tip portion and along the transverse direction between a leading edge portion and a trailing edge portion, the airfoil portion including first and second extrados and intrados faces, the fiber reinforcement including a non-interlinking forming a housing inside the fiber reinforcement, a conformation part being present in the housing, propeller vane or blade in which the non-interlinking extends over a non-interlinked area inside the airfoil portion of the fiber reinforcement comprised between the root portion and the vane tip portion in the longitudinal direction and between the leading edge portion and the trailing edge portion in the transverse direction, the non-interlinking also opening outside the airfoil portion of the fiber reinforcement.

By thus producing a fiber reinforcement in which a root portion is integrally formed, that is to say woven in a single part, with an airfoil portion, attachment portions (stilt and root) of the propeller vane or blade are perfectly maintained in position relative to the airfoil. Indeed, even in case of mechanical stresses (impacts, shocks) at the airfoil of the propeller vane or blade, there is no risk of displacement of the root portion relative to the airfoil portion because these are linked together by continuously woven portions of the reinforcement.

According to a first aspect of the propeller vane or blade of the invention, a first yarn portion of the plurality of layers of weft yarns crosses a second yarn portion of the plurality of layers of weft yarns in one area of the fiber reinforcement located in the vicinity of the non-interlinking along the transverse direction, the yarns of the first yarn portion of the plurality of layers of weft yarns extending on one side of the non-interlinking along the transverse direction while the yarns of the second yarn portion of the plurality of layers of weft yarns extend on the other side of the non-interlinking along the transverse direction. The crossing of weft yarns upstream and/or downstream of the non-interlinked area along the transverse direction allows improving the strength of the fiber blank in the non-interlinked area as well as maintaining the conformation part inside the fiber reinforcement.

According to a second aspect of the propeller vane or blade of the invention, the first yarn portion of the layers of weft yarns crosses for the first time the second yarn portion of the layers of weft yarns in one area of the fiber reinforcement located upstream of the non-interlinking along the transverse direction and crosses for the second time the second yarn portion of the layers of weft yarns in one area of the fiber reinforcement located downstream of the non-interlinking along the transverse direction.

According to a third aspect of the propeller vane or blade of the invention, a first yarn portion of the plurality of layers of warp yarns crosses a second yarn portion of the plurality of layers of warp yarns in one area of the fiber reinforcement located in the vicinity of the non-interlinking along the longitudinal direction, the yarns of the first yarn portion of the plurality of layers of warp yarns extending on one side of the non-interlinking along the longitudinal direction while the yarns of the second yarn portion of the plurality of layers of warp yarns extend on the other side of the non-interlinking along the longitudinal direction.

The crossing of warp yarns upstream and/or downstream of the non-interlinked area along the longitudinal direction allows improving the strength of the fiber blank in the non-interlinked area as well as maintaining the conformation part inside the fiber reinforcement.

According to a fifth aspect of the propeller vane or blade of the invention, the first yarn portion of the layers of warp yarns crosses for the first time the second yarn portion of the layers of warp yarns in one area of the fiber reinforcement located upstream of the non-interlinking along the longitudinal direction and crosses for the second time the second yarn portion of the layers of warp yarns in one area of the fiber reinforcement located downstream of the non-interlinking along the longitudinal direction.

An aspect of the invention also relates to an aeronautical engine comprising a plurality of blades according to the invention.

An aspect of the invention also relates to an aircraft comprising at least one engine according to the invention.

An aspect of the present invention finally relates to a method for manufacturing an aircraft propeller vane or blade comprising at least:
  producing, by three-dimensional weaving between a plurality of layers of warp yarns and a plurality of layers of weft yarns, a fiber structure in a single part, the structure comprising a root portion and an airfoil portion extending along a longitudinal direction between the root portion and a vane tip portion and along a transverse direction between a leading edge portion and a trailing edge portion, the structure including a non-interlinking forming a housing inside the fiber structure,
  shaping the fiber structure by introducing a conformation part into the housing of the fiber blank,
  densifying the preform by a matrix to obtain one of a propeller vane or blade having a fiber reinforcement constituted by the preform and densified by the matrix,
method in which the non-interlinking extends over one area inside the airfoil portion of the fiber reinforcement comprised between the root portion and the vane tip portion in the longitudinal direction and between the leading edge portion and the trailing edge portion in the transverse direction, the non-interlinking also opening outside the airfoil portion of the fiber reinforcement.

According to a first aspect of the method of the invention, a first yarn portion of the plurality of layers of weft yarns crosses a second yarn portion of the plurality of layers of weft yarns in one area of the fiber reinforcement located in the vicinity of the non-interlinking along the transverse direction, the yarns of the first yarn portion of the plurality of layers of weft yarns extending on one side of the non-interlinking along the transverse direction while the yarns of the second yarn portion of the a plurality of layers of weft yarns extend on the other side of the non-interlinking along the transverse direction.

According to a second aspect of the method of the invention, the first yarn portion of the layers of weft yarns crosses for the first time the second yarn portion of the layers of weft yarns in one area of the fiber reinforcement located upstream of the non-interlinking along the transverse direction and crosses for the second time the second yarn portion of the layers of weft yarns in one area of the fiber reinforcement located downstream of the non-interlinking along the transverse direction.

According to a third aspect of the method of the invention, a first yarn portion of the plurality of layers of warp yarns crosses a second yarn portion of the plurality of layers of warp yarns in one area of the fiber reinforcement located in the vicinity of the non-interlinking along the longitudinal direction, the yarns of the first yarn portion of the plurality of layers of warp yarns extending on one side of the non-interlinking along the longitudinal direction while the yarns of the second yarn portion of the plurality of layers of warp yarns extend on the other side of the non-interlinking along the longitudinal direction.

According to a fourth aspect of the method of the invention, the first yarn portion of the layers of warp yarns crosses for the first time the second yarn portion of the layers of warp yarns in one area of the fiber reinforcement located upstream of the non-interlinking along the longitudinal direction and in which the first yarn portion of the layers of warp yarns crosses for the second time the second yarn portion of the layers of warp yarns in one area of the fiber reinforcement located downstream of the non-interlinking along the longitudinal direction.

DETAILED DESCRIPTION

The invention generally applies to different types of propeller vanes or blades used in aircraft engines. The invention finds a beneficial but not exclusive application in large-dimensioned propeller vanes or blades which, because of their size, have a significant mass with a significant impact on the overall mass of the aircraft engine. The vane according to an aspect of the invention may in particular constitute a vane for ducted movable wheels such as fan vanes or a vane for unducted movable wheels as in the aeronautical engines called "open rotor".

Figure 1:
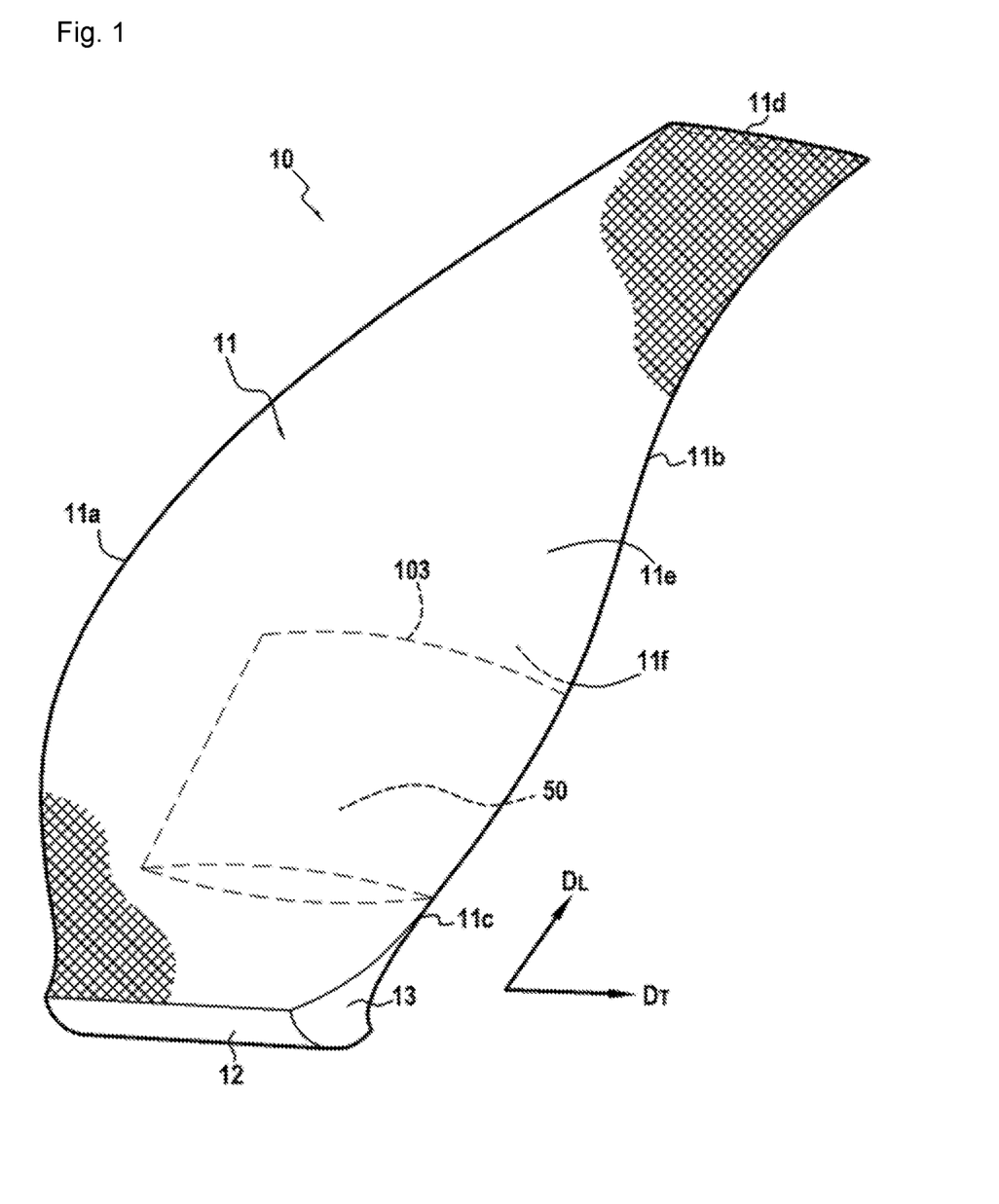
FIG. 1 is a perspective view of a vane according to one embodiment of the invention.

FIG. 1 represents a vane 10 intended to be mounted on an aircraft turboprop which comprises an airfoil 11 intended to form the airfoil portion of the blade, a root 12 formed by a portion of greater thickness, for example with a bulb-shaped section, extended by a stilt 13. The airfoil 11 comprises an extrados face 11e and an intrados face 11f and has in cross-section a curved profile of variable thickness between its leading edge 11a and its trailing edge 11b along a transverse direction DT. The airfoil 11 extends, along a longitudinal direction $D_L$, between a lower edge 11c and an upper edge 11d. The root 12 extends along the transverse direction DT over a length less than the length of the lower edge 11c of the airfoil 11.

Figure 2:
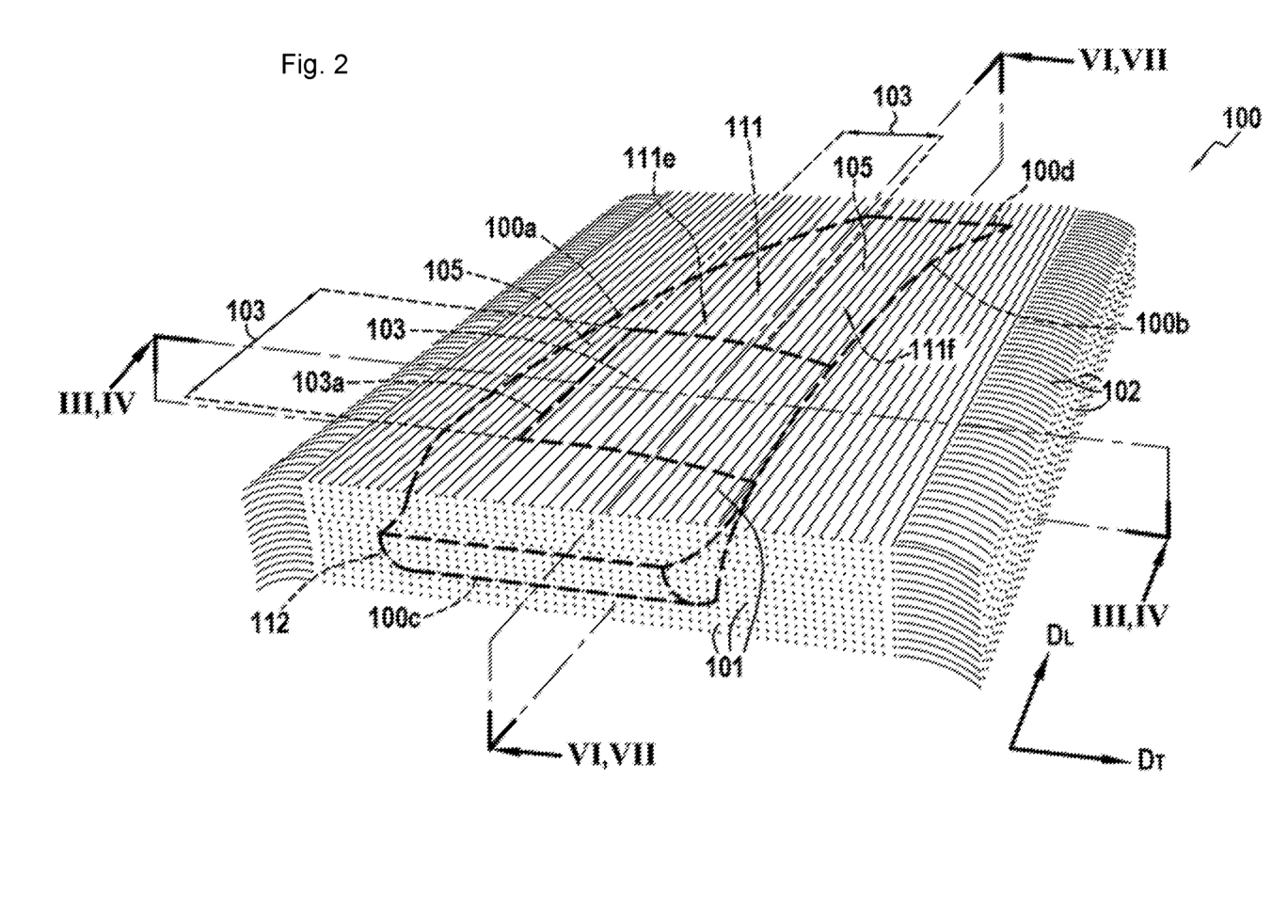
FIG. 2 is a schematic view illustrating the 3D weaving of a fiber blank for the manufacture of the vane of FIG. 1.

FIG. 2 very schematically shows a fiber structure blank 100 intended to form the fiber preform of the vane to be produced.

The fiber structure blank 100 is obtained, as schematically illustrated in FIG. 2, by three-dimensional weaving (3D) made in a known manner by means of a Jacquard-type loom on which a bundle of warp yarns 101 or strands has been disposed in a plurality of layers of several hundred yarns each, the warp yarns being linked by weft yarns 102. The fiber structure blank 100 is woven in a single part, the blank extending in a longitudinal direction $D_L$ between a lower portion 100c and an upper portion 100d and in a transverse direction DT between a front edge 100a and a rear edge 100b, the blank comprising an airfoil blank 111 defining two faces 111e and 111f intended to form respectively the extrados and intrados faces of the vane and a bulged portion 112 blank intended to subsequently form a vane root and extending outside the airfoil blank 111 along the longitudinal direction $D_L$ and set back from the front and rear edges 100a and 100b along the transverse direction DT.

In the example illustrated, the 3D weaving is an "interlock" weave. By "interlock" weaving is meant here a weave in which each layer of weft yarns links several layers of warp yarns with all the yarns of the same weft column having the same movement in the plane of the weave.

Other known types of three-dimensional weaving can be used, such as in particular those described in document WO 2006/136755, the content whereof is incorporated here by reference. This document describes in particular the production by weaving in a single part of fiber reinforcement structures for parts such as vanes having a first type of core weave and a second type of skin weave that allow conferring both the mechanical and aerodynamic properties expected for this type of part.

The fiber blank according to an aspect of the invention can be woven in particular from carbon or ceramic fiber yarns such as silicon carbide.

As the fiber blank, whose thickness and width vary, is weaved, a number of warp yarns are not woven, which makes it possible to define the contour and the desired thickness, continuously variable, of the blank 100. One example of evolving 3D weaving making it possible in particular to vary the thickness of the blank between a first edge intended to form the leading edge and a second edge of reduced thickness and intended to form the leading edge is described in document EP 1 526 285, the content whereof is incorporated here by reference.

Figure 8:
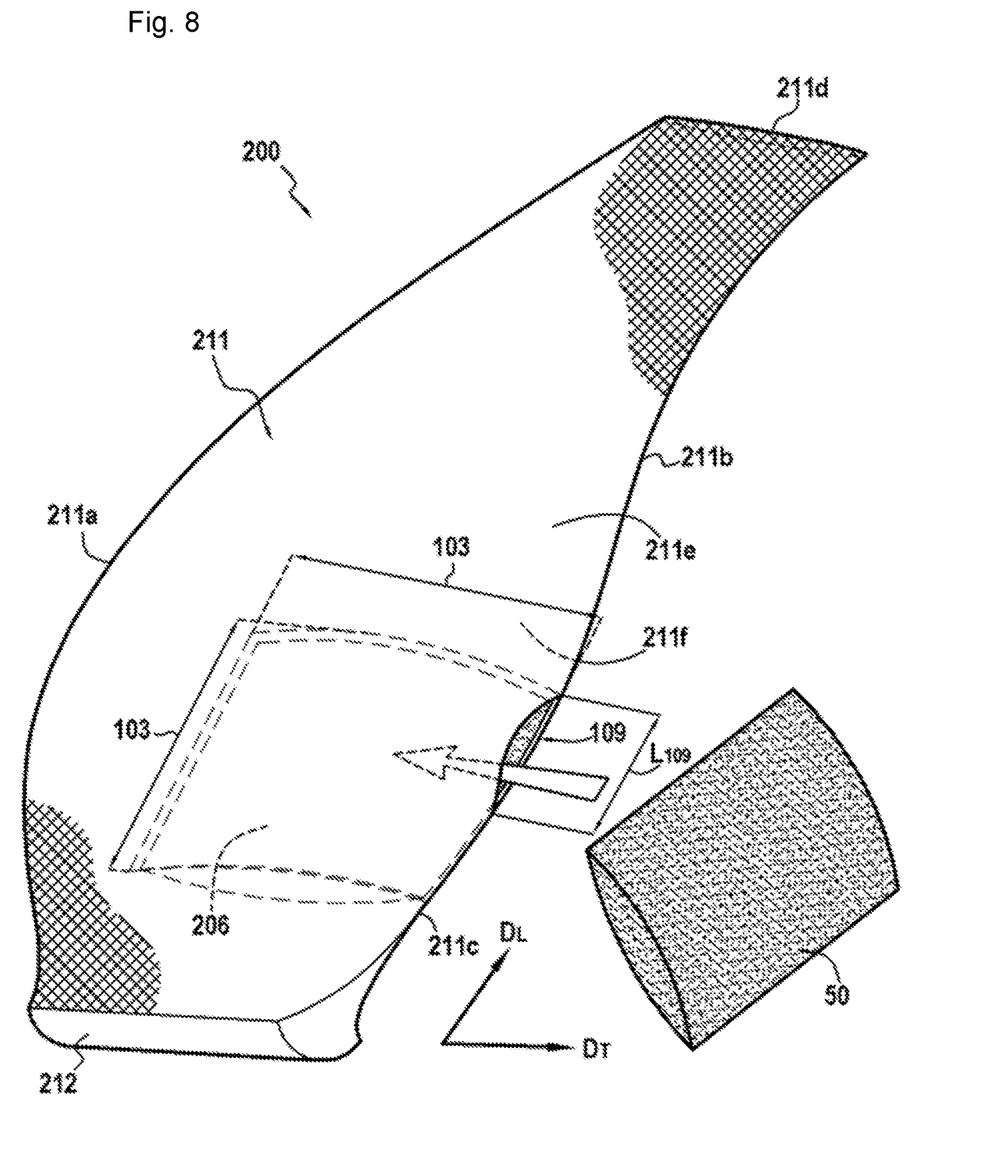
FIG. 8 is a perspective view showing the insertion of a conformation part into a fiber structure derived from the fiber blank of FIG. 2.

During the weaving, a non-interlinking 103 is made inside the fiber blank 100 between two successive layers of warp yarns, the non-interlinking 103 extending over a non-interlinked area delimited by a contour 103a separating the non-interlinked area from an interlinked area 105 in the fiber blank. The non-interlinking 103 allows arranging a housing 206 (FIG. 8) with the dimensions of a conformation part 50 intended to be placed inside the fiber blank 100 to form the blade preform (FIG. 8).

Figure 3:
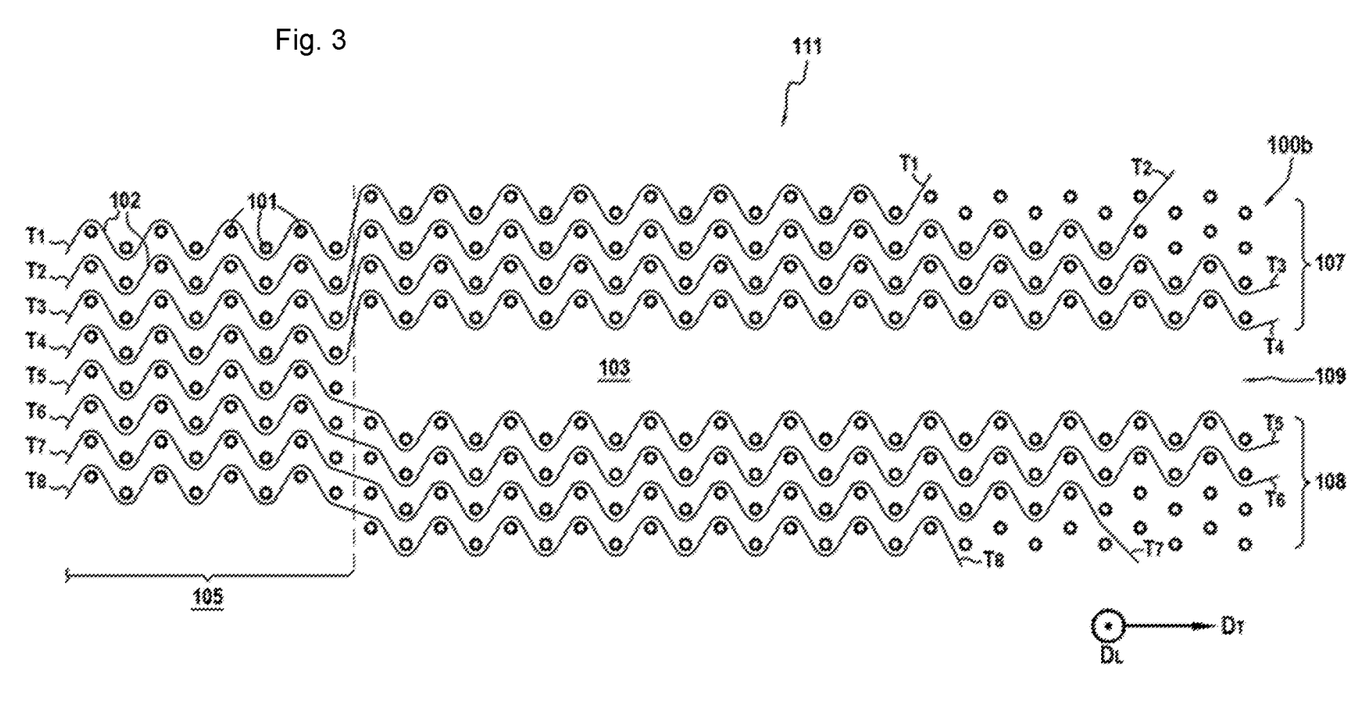
FIG. 3 is a partial sectional view in the weft direction on an enlarged scale of a set of yarn layers showing the formation of a non-interlinked area in the blank of FIG. 2 opening at the leading edge portion.

A 3D weaving mode with interlock weave of the blank 100 is schematically shown in FIG. 3. FIG. 3 is a partial enlarged view of a sectional warp plane in the airfoil blank 111 of the blank 100 including the non-interlinking 103 (section III-III in FIG. 2). In this example, the blank 100 comprises 8 layers of warp yarns 101 extending substantially in the longitudinal direction $D_L$. In FIG. 3, the 8 layers of warp yarns are linked by weft yarns $T_1$ to $T_8$ in the interlinked area 105 of the fiber blank 100, the weft yarns extending substantially in the transverse direction DT. At the non-interlinking 103, the 4 layers of warp yarns 101 forming the set of yarn layers 107 are linked together by 4 weft yarns $T_1$ to $T_4$, just as the 4 layers of warp yarns forming the set of yarn layers 108 are linked by 4 weft yarns $T_5$ to $T_8$. In other words, the fact that the weft yarns $T_1$ to $T_4$ do not extend into the yarn layers 108 and that the weft yarns $T_5$ to $T_8$ do not extend into the yarn layers 107 ensures the non-interlinking 103 which separates the sets of layers of warp yarns 107 and 108 from each other.

At the non-interlinking 103 of the example of weaving presented in FIG. 3, the weft yarns $T_1$ to $T_4$, on the one hand, and the weft yarns $T_5$ to $T_8$, on the other hand, are respectively disposed on each side of the non-interlinking 103, the weft yarns $T_1$ to $T_4$ linking the first four layers of warp yarns forming the set of yarn layers 107 and the weft yarns $T_5$ to $T_8$ linking the last four layers of warp yarn forming the set of yarn layers 108. In the example described here, the weft yarns $T_1$ and $T_2$, on the one hand, and the weft yarns $T_7$ and $T_8$, on the other hand, emerge upstream of the rear edge 100b in order to manage the reduction in thickness in this airfoil portion.

Still in the example of weaving presented in FIG. 3, the non-interlinking 103 extends up to the rear edge 100b of the fiber blank intended to form the trailing edge 11b of the vane 10 (FIG. 1). The non-interlinking here opens outside the airfoil blank 111 at the rear edge 100b in which it forms an opening 109 for the introduction of a conformation part as described below. According to one variant, the non-interlinking 103 can open at the front edge 100a of the fiber blank 100 intended to form the leading edge 11a of the vane 10.

Figure 4:
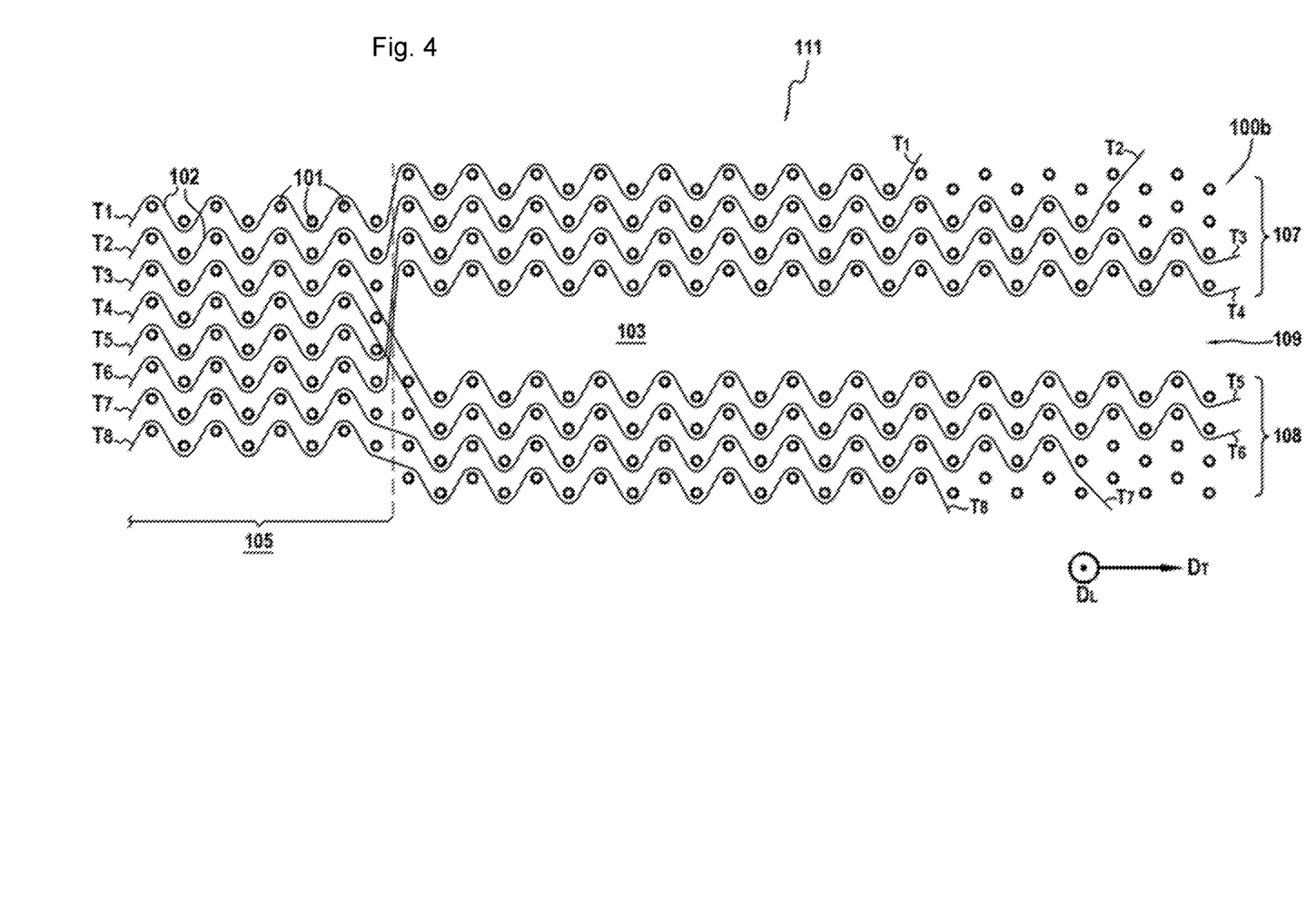
FIG. 4 is a partial sectional view in the weft direction on an enlarged scale of a set of yarn layers showing a variant of the non-interlinked area in the blank of FIG. 2 opening at the leading edge portion.

According to one variant illustrated in FIG. 4 (section Iv-Iv in FIG. 2), a first yarn portion of the layers of weft yarns crosses a second yarn portion of the layers of weft yarns in one area of the airfoil blank 111 of the fiber blank located in the vicinity of the non-interlinked area 104 along the transverse direction DT, the yarns of the first weft yarn portion 102 extending on one side of the non-interlinking 103 along the transverse direction DT while the yarns of the second yarn portion of the plurality of layers of weft yarns 102 extend on the other side of the non-interlinking 103 along the transverse direction DT. More specifically, one or several weft yarns 102 linking layers of warp yarns forming the set of yarn layers 107 in the interlinked area 105 are used to link layers of warp yarns forming the set of yarn layers 108 in the interlinked area 105 and vice versa. In the example illustrated in FIG. 4, the weft yarns $T_3$ and $T_4$, linking layers of warp yarns 101 of the set of yarn layers 107 in the interlinked area 105 are deviated at the beginning or upstream of the non-interlinking 103 along the transverse direction DT to link layers of warp yarns 101 of the set of yarn layers 108. Similarly, the weft yarns $T_5$ and $T_6$, linking layers of warp yarns 101 of the set of yarn layers 108 in the interlinked area 105 are deviated at the beginning or upstream of the non-interlinking 103 along the transverse direction DT to link layers of warp yarns 101 of the set of yarn layers 107. The crossing of the weft yarns $T_3$ and $T_4$ and the weft yarns $T_5$ and $T_6$ upstream of the non-interlinking 103 along the transverse direction DT makes it possible to improve the strength of the fiber blank in the non-interlinked area.

In the example of weaving presented in FIG. 4, the non-interlinking 103 extends up to the rear edge 100b of the fiber blank intended to form the trailing edge 11b of the vane 10 (FIG. 1). The non-interlinking here opens outside the airfoil blank 111 at the rear edge 100b in which it forms an opening 109 for the introduction of a conformation part as described below. According to one variant, the non-interlinking 103 can open at the front edge 100a of the fiber blank 100 intended to form the leading edge 11a of the vane 10.

Figure 5:
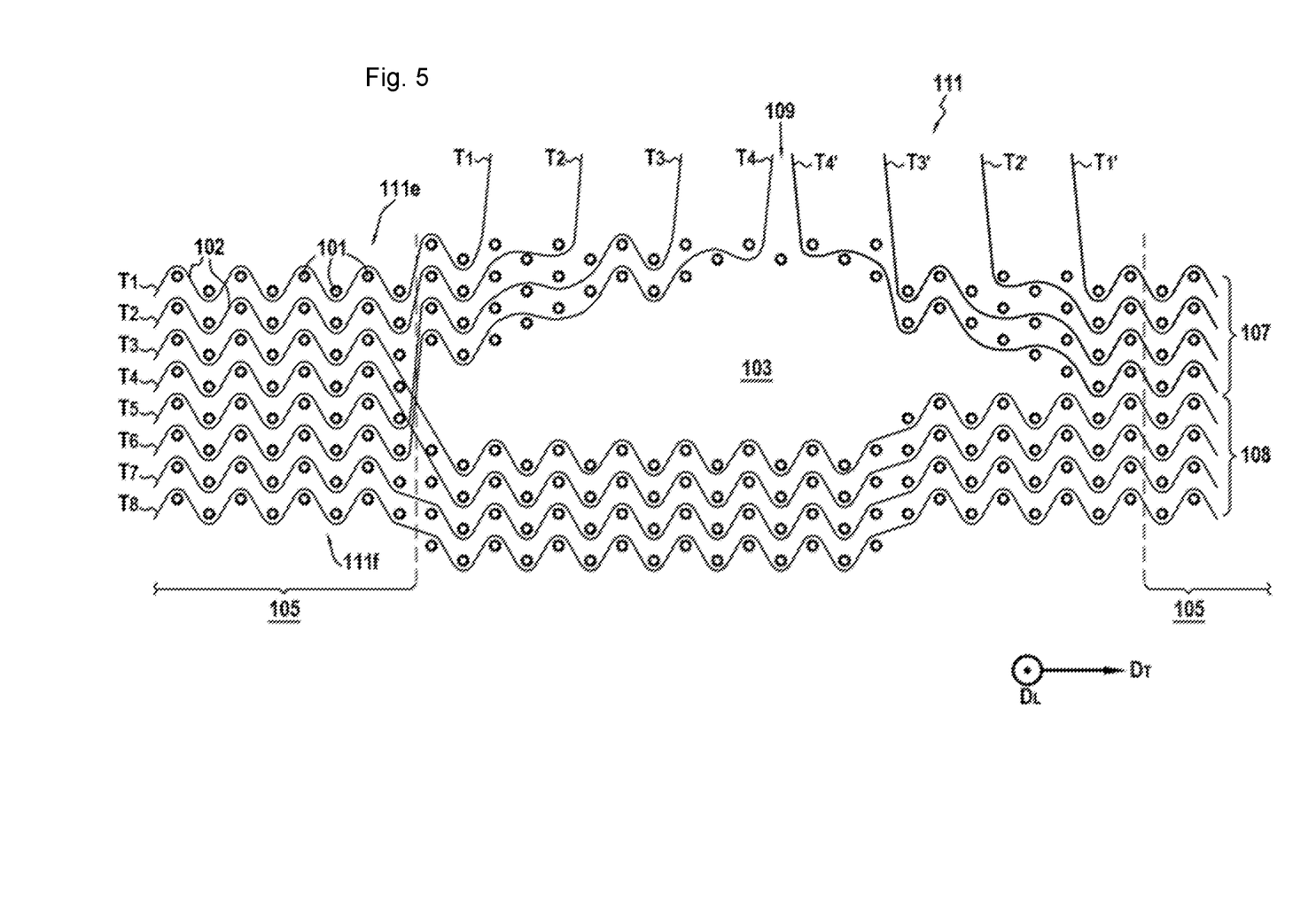
FIG. 5 is a partial sectional view in the weft direction on an enlarged scale of a set of yarn layers showing the formation of a non-interlinked area in the blank of FIG. 2 opening at one face of the airfoil blank.

FIG. 5 illustrates a partial enlarged view of another variant of weaving along a warp sectional plane in a portion of the blank 100 including the non-interlinking 103. In this variant, the non-interlinked area 103 opens onto the face 111e of the airfoil blank 111 intended to form the extrados face 11e of the vane 10. In this variant example, the blank 100 comprises 8 layers of warp yarns 101 extending substantially in the longitudinal direction $D_L$. In FIG. 5, the 8 layers of warp yarns are linked by weft yarns $T_1$ to $T_8$ in the interlinked areas 105 of the fiber blank 100, the weft yarns extending substantially in the transverse direction DT. At the beginning of the non-interlinking 103, the 4 layers of warp yarns 101 forming the set of yarn layers 107 are linked together by 4 weft yarns $T_1$ to $T_4$, just as the 4 layers of warp yarns forming the set of yarn layers 108 are linked by 4 weft yarns $T_5$ to $T_8$, the weft yarns $T_1$ to $T_4$, on the one hand, and the weft yarns $T_5$ to $T_8$, on the other hand, being respectively disposed on either side of the non-interlinking 103.

In order to open the non-interlinking 103 on the face 111e of the airfoil blank 111, the weft yarns $T_1$ to $T_4$ gradually emerge from the blank to form an opening 109 and then weft yarns $T_{1'}$ to $T_{4'}$ are gradually reintroduced into the blank to achieve the end of the non-interlinking 103 and the second interlinked area 105 which extends towards the rear edge 100b. An opening 109 is thus formed, allowing the introduction of a conformation element into the housing formed by the non-interlinking 103 inside the airfoil blank. The same weft yarn emergences as described above can be achieved with the weft yarns $T_5$ to $T_8$ while reintroducing similar weft yarns after the opening in order to open the non-interlinking 103 on the face 111f of the airfoil blank intended to form the intrados face 11f of the vane 10.

Figures 6, 7:
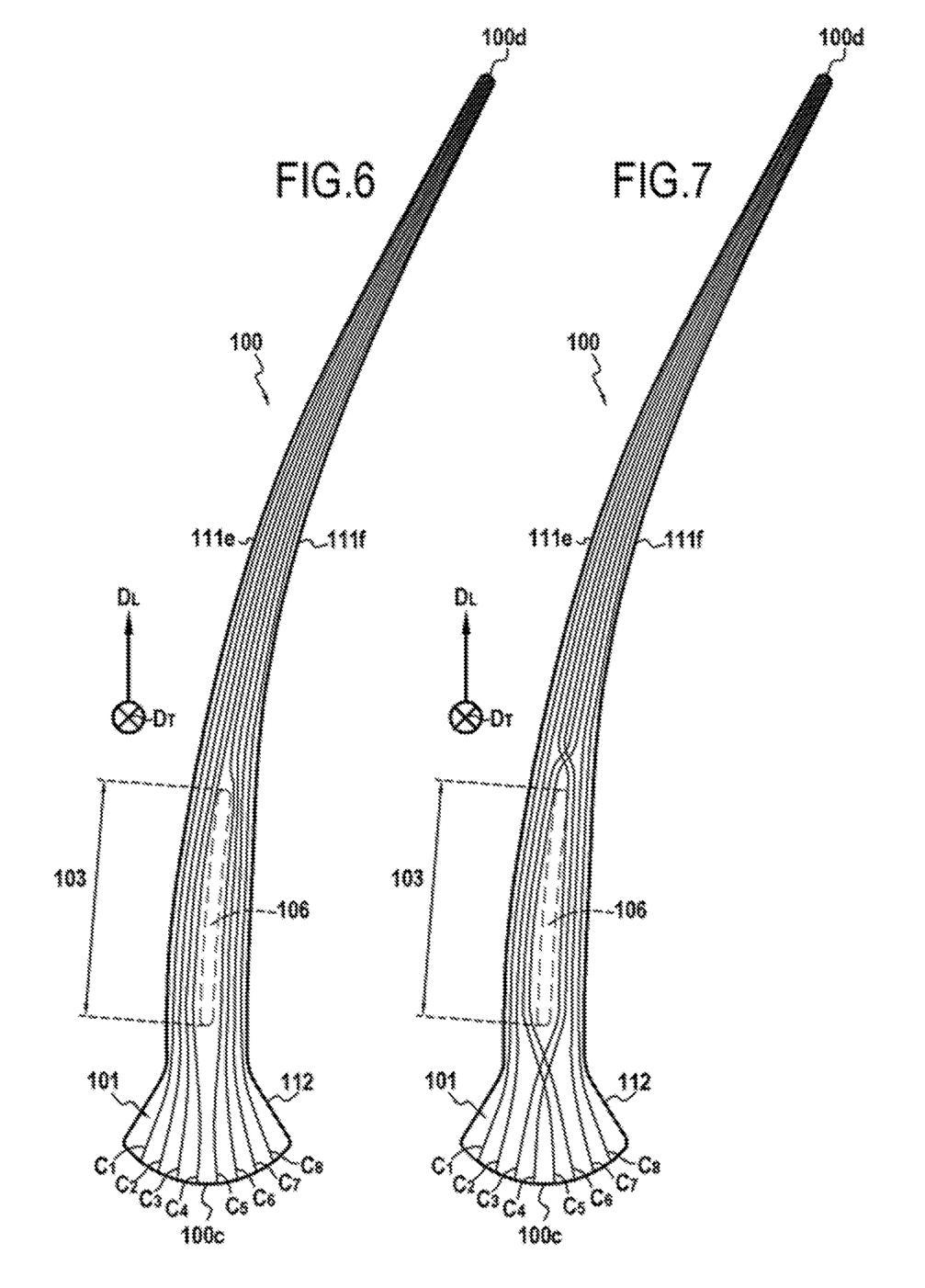
FIG. 6 is a sectional view in the warp direction of a set of yarn layers showing the formation of a non-interlinked area in the blank of FIG. 2.
FIG. 7 is a sectional view in the warp direction of a set of yarn layers showing a variant of the non-interlinked area in the blank of FIG. 2.

Concerning the warp yarns 101 in the fiber blank 100, these can, according to one aspect of the invention, follow the same path from the bulged portion 112 up to the upper portion 100d by passing on each side of the non-interlinking 103 as represented in FIG. 6 for the warp yarns $C_1$ to $C_8$ (section VI-VI in FIG. 2).

According to another aspect of the invention illustrated in FIG. 7 (section VII-VII in FIG. 2), a first yarn portion of the layers of warp yarns 101, here the yarns $C_3$ and $C_4$, crosses a second yarn portion of the layers of warp yarns 101, here the yarns $C_5$ and $C_6$, in one area of the fiber blank 100 located at the beginning or upstream of the non-interlinked area 104 along the longitudinal direction $D_L$, the yarns $C_3$ and $C_4$ of the first yarn portion of the layers of warp yarns extending on one side of the non-interlinked area 104 along the longitudinal direction $D_L$ while the yarns $C_5$ and $C_6$ of the second yarn portion of the layers of warp yarns extend on the other side of the non-interlinked area 104 along the longitudinal direction $D_L$. Next, the yarns $C_3$ and $C_4$ again cross the yarns $C_5$ and $C_6$ in one area of the fiber blank 100 located at the end or downstream of the non-interlinked area 104 along the longitudinal direction $D_L$. The crossing of the warp yarns $C_3$ and $C_4$ and of the warp yarns $C_5$ and $C_6$ upstream and/or downstream of the non-interlinked area 104 along the longitudinal direction $D_L$ makes it possible to improve the strength of the fiber blank in the non-interlinked area. According to one variant, a portion of the warp yarns can cross over only upstream or downstream of the non-interlinked area 104 along the longitudinal direction $D_L$.

In the example described here, the non-interlinking 103 is achieved between two adjacent columns of weft yarns. On all weft yarn columns, the non-interlinking is also achieved along two adjacent columns of warp yarns. However, depending on the shape of the non-interlinked area desired to be obtained, the non-interlinking according to the invention can be evolving. In this case, the non-interlinking can be achieved between different columns of weft yarns along the transverse direction DT and/or the longitudinal direction $D_L$.

According to yet another variant, the non-interlinking can open at the upper portion 100d of the airfoil blank 111 intended to form the upper edge 11d of the vane 10. In this case, the non-interlinking, such as for example the non-interlinking illustrated in FIG. 6, is extended up to the upper portion 110d along the longitudinal direction $D_L$.

Once the fiber structure blank 100 is woven, the floating yarns present outside the woven mass are cut out (phase called "trimming" phase). Then the contour of the flat preform is cut out, for example with a water jet.

There is then obtained, as illustrated in FIG. 8, a fiber structure 200 woven in a single part and having an airfoil 211 and a bulged portion 212, the airfoil 211 extending in the longitudinal direction $D_L$ between a lower end 211c and an upper end 211d and in the transverse direction DT between a front edge or leading edge portion 211a and a rear edge or trailing edge portion 211b intended to form respectively the leading and trailing edges of the vane. The airfoil 211 includes two faces 211e and 211f intended to form respectively the extrados and intrados faces of the vane. The fiber structure 200 includes the non-interlinking 103 extending between the front and rear edges 211a and 211d of the airfoil 211 along the transverse direction DT and between the lower and upper ends 211c and 211d of the airfoil 211 along the longitudinal direction $D_L$. The bulged portion 212 located outside the airfoil is intended to form the root 12 of the vane 10.

The non-interlinking 103 delimits inside the airfoil 211 an internal housing 206 accessible via the opening 109 located on the side of the rear edge or trailing edge portion 211b. In FIG. 8, the conformation of the fiber structure 200 into a vane preform is achieved by introducing into the internal housing 206 the conformation part 50 via the opening 109. The opening 109 does not necessarily extend over the entire length of the non-interlinking as in the example described here where the size of the opening 109 has been optimized in that it extends along the longitudinal direction $D_L$ over a minimum length L109 allowing the introduction of the conformation part 50 into the housing 206 by its smallest dimension or by deformation thereof, the operator using tools adapted to place the conformation part into the housing.

Once the conformation part 50 is introduced and positioned into the housing 206, the fiber vane preform is densified. The opening 109 can be closed by stitching before densification.

The densification of the fiber preform consists in filling the porosity of the preform, in all or part of the volume thereof, with the material constituting the matrix.

The matrix of the composite material can be obtained in a manner known per se according to the method by liquid process.

The method by liquid process consists in impregnating the preform with a liquid composition containing an organic precursor of the matrix material. The organic precursor is usually in the form of a polymer, such as a resin, optionally diluted in a solvent. The preform is placed in a mold which can be sealingly closed with a housing having the shape of the final molded part and which can in particular have a twisted shape corresponding to the final shape of the blade. Then, the mold is closed and the liquid matrix precursor is injected (for example a resin) throughout the housing to impregnate the entire fiber portion of the preform.

The transformation of the precursor into organic matrix, namely its polymerization, is carried out by heat treatment, generally by heating of the mold, after elimination of the possible solvent and crosslinking of the polymer, the preform being always maintained in the mold having a shape corresponding to that of the vane.

The organic matrix can be in particular obtained from epoxy resins, such as the high-performance epoxy resin sold under the reference PR 520 by the company CYTEC, or from liquid precursors of carbon or ceramic matrices.

In the case of the formation of a carbon or ceramic matrix, the heat treatment consists in pyrolyzing the organic precursor in order to transform the organic matrix into a carbon or ceramic matrix according to the precursor used and the pyrolysis conditions. For example, liquid carbon precursors can be resins with relatively high coke content, such as phenolic resins, while liquid ceramic precursors, in particular SiC, can be polycarbosilane-type resins (PCS) or polytitanocarbosilane (PTCS) or polysilazane (PSZ). Several consecutive cycles, from impregnation to heat treatment, can be carried out to achieve the desired degree of densification.

According to one aspect of the invention, the densification of the fiber preform can be achieved by the well-known transfer molding process called RTM (Resin Transfer Molding). In accordance with the RTM process, the fiber preform is placed in a mold having the external shape of the blade. A thermosetting resin is injected into the internal space delimited between the rigid-material part and the mold and which comprises the fiber preform. A pressure gradient is generally established in this internal space between the place where the resin is injected and the evacuation orifices of the latter in order to control and optimize the impregnation of the preform by the resin.

The resin used can be, for example, an epoxy resin. The resins suitable for the RTM processes are well known. In an embodiment, they have a low viscosity to facilitate their injection into the fibers. The choice of the temperature class and/or of the chemical nature of the resin is determined based on the thermomechanical stresses to which the part must be subjected. Once the resin is injected into all the reinforcement, it is polymerized by heat treatment in accordance with the RTM process.

After injection and polymerization, the part is removed from the mold. In the end, the part is trimmed to remove the excess resin and the chamfers are machined. No other machining is necessary since, the part being molded, it respects the required dimensions. A vane made of composite material 10 is then obtained as represented in FIG. 1.

The rigid cellular material used to make the conformation part 50 is desirably a material with closed cells so as to prevent the penetration of the resin therein and thus preserve its low density after densification of the fiber preform.

The invention claimed is:

1. An aircraft propeller vane or blade comprising a fiber reinforcement having a three-dimensional weaving between a plurality of layers of warp yarns and a plurality of layers of weft yarns, the fiber reinforcement being densified by a matrix, the fiber reinforcement comprising in a single woven part a root portion and an airfoil portion extending along a longitudinal direction between the root portion and a vane tip portion and along a transverse direction between a leading edge portion and a trailing edge portion, the airfoil portion including first and second extrados and intrados faces, the fiber reinforcement including a non-interlinking forming a housing inside said fiber reinforcement, a conformation part being present in the housing, propeller vane or blade in which the non-interlinking extends over a non-interlinked area inside the airfoil portion of the fiber reinforcement comprised between the root portion and the vane tip portion in the longitudinal direction and between the leading edge portion and the trailing edge portion in the transverse direction, the non-interlinking also opening outside the airfoil portion of the fiber reinforcement,
wherein the first yarn portion of the layers of weft yarns crosses for the first time the second yarn portion of the layers of weft yarns in one area of the fiber reinforcement located upstream of the non-interlinking along the transverse direction and in which the first yarn portion of the layers of weft yarns crosses for the second time the second yarn portion of the layers of weft yarns in one area of the fiber reinforcement located downstream of the non-interlinking along the transverse direction.

2. The propeller vane or blade according to claim 1, wherein a first yarn portion of the plurality of layers of weft yarns crosses a second yarn portion of the plurality of layers of weft yarns in one area of the fiber reinforcement located in the vicinity of the non-interlinking along the transverse direction, the yarns of the first yarn portion of the plurality of layers of weft yarns extending on one side of the non-interlinking along the transverse direction while the yarns of the second yarn portion of the plurality of layers of weft yarns extend on the other side of the non-interlinking along the transverse direction.

3. The propeller vane or blade according to claim 1, wherein a first yarn portion of the plurality of layers of warp yarns crosses a second yarn portion of the plurality of layers of warp yarns in one area of the fiber reinforcement located in the vicinity of the non-interlinking along the longitudinal direction, the yarns of the first yarn portion of the plurality of layers of warp yarns extending on one side of the non-interlinking along the longitudinal direction while the yarns of the second yarn portion of the plurality of layers of warp yarns extend on the other side of the non-interlinking along the longitudinal direction.

4. The propeller vane or blade according to claim 3, wherein the first yarn portion the layers of warp yarns crosses for the first time the second yarn portion of the layers of warp yarns in one area of the fiber reinforcement located upstream of the non-interlinking along the longitudinal direction and wherein the first yarn portion of the layers of warp yarns crosses for the second time the second yarn portion of the layers of warp yarns in one area of the fiber reinforcement located downstream of the non-interlinking along the longitudinal direction.

5. An aeronautical engine comprising a plurality of blades according to claim 1.

6. An aircraft comprising at least one engine according to claim 5.

7. A method for manufacturing an aircraft propeller vane or blade comprising:
producing, by three-dimensional weaving between a plurality of layers of warp yarns and a plurality of layers of weft yarns, a fiber structure in a single part, the structure comprising a root portion and an airfoil portion extending along a longitudinal direction between the root portion and a vane tip portion and along a transverse direction between a leading edge portion and a trailing edge portion, said structure including an non-interlinking forming a housing inside the fiber structure,
shaping the fiber structure by introducing a conformation part into the housing of the fiber structure,
densifying the preform by a matrix to obtain one of a propeller vane or blade having a fiber reinforcement constituted by said preform and densified by the matrix, the non-interlinking extending over a non-interlinked area inside the airfoil portion of the fiber reinforcement comprised between the root portion and the vane tip portion in the longitudinal direction and between the leading edge portion and the trailing edge portion in the transverse direction, the non-interlinking opening outside the airfoil portion of the fiber reinforcement, wherein a first yarn portion of the plurality of layers of warp yarns crosses a second yarn portion of the plurality of layers of warp yarns in one area of the fiber reinforcement located in the vicinity of the non-interlinking along the longitudinal direction, the yarns of the first yarn portion of the plurality of layers of warp yarns extending on one side of the non-interlinking along the longitudinal direction while the yarns of the second portion of yarns of the plurality of layers of warp yarns extend on the other side of the non-interlinking along the longitudinal direction.

8. A method according to claim 7, wherein a first yarn portion of the plurality of layers of weft yarns crosses a second yarn portion of the plurality of layers of weft yarns in one area of the fiber reinforcement located in the vicinity of the non-interlinking along the transverse direction, the yarns of the first yarn portion of the plurality of layers of weft yarns extending on one side of the non-interlinking along the transverse direction while the yarns of the second yarn portion of the plurality of layers of weft yarns extend on the other side of the non-interlinking (103) along the transverse direction.

9. The method of claim 8, wherein the first yarn portion of the layers of weft yarns crosses for the first time the second yarn portion of the layers of weft yarns in one area of the fiber reinforcement located upstream of the non-interlinking along the transverse direction and wherein the first yarn portion of the layers of weft yarns crosses for the second time the second yarn portion of the layers of weft yarns in one area of the fiber reinforcement located downstream of the non-interlinking along the transverse direction.

10. The method according to claim 7, wherein the first yarn portion of the layers of warp yarns crosses for the first time the second yarn portion of the layers of warp yarns in one area of the fiber reinforcement located upstream of the non-interlinking along the longitudinal direction and wherein the first yarn portion of the layers of warp yarns crosses for the second time the second yarn portion of the layers of warp yarns in one area of the fiber reinforcement located downstream of the non-interlinking along the longitudinal direction.

* * * * *